United States Patent [19]

Sato

[11] Patent Number: 4,817,433

[45] Date of Patent: Apr. 4, 1989

[54] ULTRASONIC IMAGING APPARATUS

[75] Inventor: Takeshi Sato, Ootawara, Japan

[73] Assignee: Kabushiki Kaisha Toshiba, Kawasaki, Japan

[21] Appl. No.: 893,238

[22] Filed: Aug. 5, 1986

[30] Foreign Application Priority Data

Aug. 14, 1985 [JP] Japan .................. 60-179889

[51] Int. Cl.[4] ........................................... G01N 29/00
[52] U.S. Cl. .................... 73/620; 128/660.04
[58] Field of Search ................. 73/620, 626; 358/112; 128/660, 660.04

[56] References Cited

U.S. PATENT DOCUMENTS

| 4,141,347 | 2/1979 | Green et al. | 128/660 |
|---|---|---|---|
| 4,206,654 | 6/1980 | Keller et al. | 73/620 |
| 4,520,671 | 6/1985 | Hardin | 73/620 |
| 4,773,425 | 9/1988 | Saitou | 128/660.04 |

FOREIGN PATENT DOCUMENTS 3440853 5/1985 Fed. Rep. of Germany .
3524954 1/1986 Fed. Rep. of Germany .

OTHER PUBLICATIONS

H. Hoshino et al., "Microprogrammable Ultrasonic Image Processor and Its Application to Image Manipulation", *Society Photo-Optical Instrument Engineering*, vol. 314, Digital Radiography (1981), pp. 354–361.

"A Real Time Ultrasonic Diagnostic System for Simultaneous Image Displays", *IEE*, vol. 16, No. 154 (Oct. 1979), pp. 66–69.

*Primary Examiner*—John Chapman
*Attorney, Agent, or Firm*—Finnegan, Henderson, Farabow, Garrett & Dunner

[57] ABSTRACT

An ultrasonic imaging apparatus having an ultrasonic transducer for steering a subject. The transducer alternately steers a region of interest of the subject and a desired part of this region, with ultrasonic beams. The image signals obtained by steering the region of interest and the image signals obtained by steering the part the region of interest are alternately processed. The signals thus processed are input to a display. The display simultaneously displays the image of the region of interest and an enlarged image of the part of the region.

8 Claims, 2 Drawing Sheets

ULTRASONIC IMAGING APPARATUS

BACKGROUND OF THE INVENTION

The present invention relates to an ultrasonic imaging appratus which can form an ultrasonic image in real time, enlarge or reduce the image and move the image on a display screen.

U.S. Ser. No. 852,793 discloses an apparatus which can form an ultrasonic tomogram, and move the tomogram on a display screen, and also can display an enlarged part of the tomogram on another screen while displaying the entire tomogram. This apparatus has an ultrasonic transducer. The transducer steers the region of interest (hereinafter called "ROI") with ultrasonic beams, thus obtaining image signals representing the tomogram. The image signals are stored in a frame memory for storing an entire image. The signals are read from frame memory and supplied to a display having two screens. The tomogram is displayed on the first screen. To enlarge and display a part of the tomogram, a cursor is moved on the first screen, thereby designating this part of the tomogram. Then, the ultrasonic transducer steers that part of the ROI which corresponds to the designated part of the tomogram, thus obtaining image signals representing the designated part of the tomogram. These signals are stored in a memory for storing an enlarged image. The signals are read from the memory and converted to enlarged image signals by a zooming process circuit. The enlarged image signals are input to the display, whereby the enlarged, designated part of the tomogram is displayed on the second screen.

The conventional ultrasonic imaging apparatus described above needs two signal-processing systems, one for processing signals to display the entire tomogram and the other for processing signals to display an enlarged part of the tomogram.

SUMMARY OF THE INVENTION

The object of the present invention is to provide an ultrasonic imaging apparatus which has a simple signal-processing system but can simultaneously display a whole tomogram of the ROI of a subject and an enlarged part of the tomogram.

According to the invention, there is provided an ultrasonic imaging apparatus which alternately steers a ROI of a subject and a part of this ROI with ultrasonic beams and alternately processes the signals obtained by steering the entire ROI and the part of ROI, thereby simultaneously displaying a tomogram of the ROI and an enlarged part of the ROI.

DETAILED DESCRIPTION OF THE PREFERRED EMBODIMENT

Figure 1:
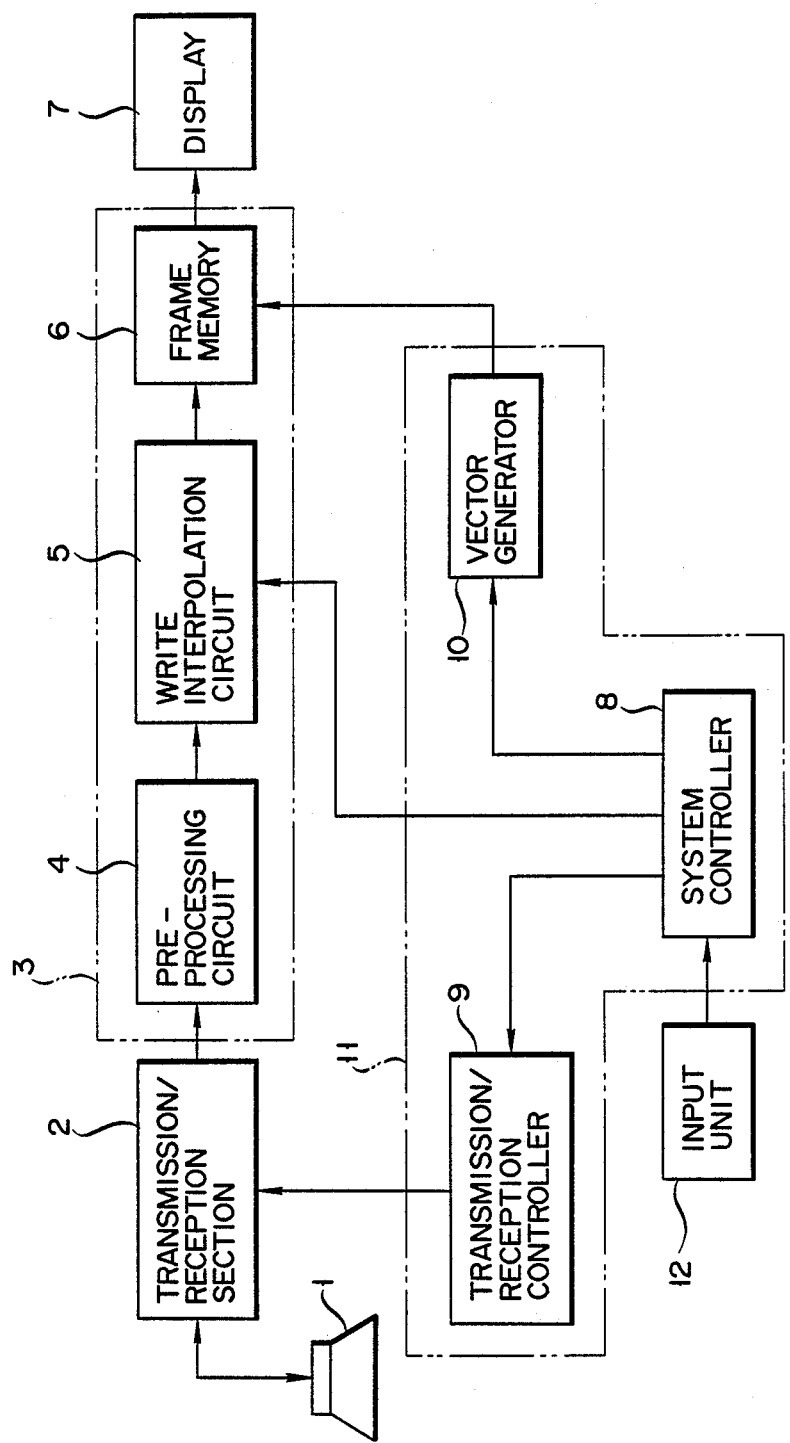
FIG. 1 is a block diagram showing an ultrasonic imaging apparatus according to the invention.

FIG. 1 shows an ultrasonic imaging apparataus according to the present invention. As shown in this figure, the apparatus comprises ultrasonic transducer 1, ultrasonic transmission/reception section 2, signal-processing section 3, display 7, control section 11, and input unit 12. Transducer 1 is driven by drive pulses to emit ultrasonic beams to the ROI of a subject and to receive echoes from the ROI. It is coupled to ultrasonic transmission/reception section 2.

Section 2 has a drive circuit for supplying drive pulses to transducer 1 and a signal-receiving circuit for receiving the echo signals generated by transducer 1. Drive circuit has a delay circuit and a pulser. The delay circuit serves to focus and deflect an ultrasonic beam. The pulser is driven by the output signals of the delay circuit and generates drive pulses. A switch circuit is coupled at one end to transducer 1 and can be connected at the other end to the drive circuit or the signal-receiving circuit.

Signal-processing section 3 has a pre-processing circuit 4, write interpolation circuit 5 and frame memory 6. The output terminal of transmission/reception section 2 is connected to pre-processing circuit 4. Circuit 4 converts every analog echo signal supplied from section 2 to a digital signal. The output of preprocessing circuit 4 is coupled to write interpolation circuit 5. Circuit 5 interpolates the digital echo signal. The interpolated echo signal is stored in frame memory 6. The output of frame memory 6 is coupled to display 7.

Control section 11 comprises system controller 8, transmission/reception controller 9 and vector generator 10. Controller 8 is a microcomputer and controls write interpolation circuit 5, transmission/reception controller 9 and vector generator 10. More precisely, system controller 8 produces three kinds of control signals in response to the input signals supplied from input unit 12. The control signals are supplied to circuit 5, controller 9 and vector generator 10. Input unit 12 comprises a track ball for designating the area to be steered, a desired rate pulse frequency and the area to be displayed. (The track ball can be replaced by a means performing the same function.) Vector generator 10 generates vector data showing the directions and lengths of steering lines. Thus data designates some of the addresses of frame memory 6. The pieces of image data corresponding to the steering lines are stored at the designated addresses of frame memory 6.

The operation of the ultrasonic imaging apparatus will now be explained. First, the user operates input unit 12, thereby inputting rate pulse frequency fl (rate cycle T1 is, for example, 222 μs (micro-second) when the maximum depth of view field is 15 cm) and beam steering angle θ1 (e.g., 90°), and steering lines n1 (e.g., 256 lines), so that transducer 1 can steer the desired ROI. In this case, 17.6 frames of image can be obtained every second. In response to the signals showing rate cycle T1, angle θ1 and steering lines n1, system controller 8 supplies a control signal to transmission/reception controller 9. In response to this signal, controller 9 controls transmission/reception section 2 such that transducer 1 steers the ROI defined by rate cycle T1 and angle θ1, along n1 steering lines. That is, in response to the control signal, controller 9 supplies section 2 with delay time data representing the various times by which the beam steering must be delayed for the respective n1 steering lines.

In accordance with the delay time data, section 2 sequentially supplies drive pulses to transducer elements of transducer 1, whereby transducer 1 emits ultrasonic beams, thus steering the ROI along the steering lines. The beams are reflected from the ROI. The transducer 1 catches the echoes from the ROI and converts them into echo signals. The delay circuit provided in section 2 delays the echo signals by the delay times represented by the delay time data supplied from transmission/reception controller 9. The echo signals are then added within transmission/reception section 2.

Figure 3:
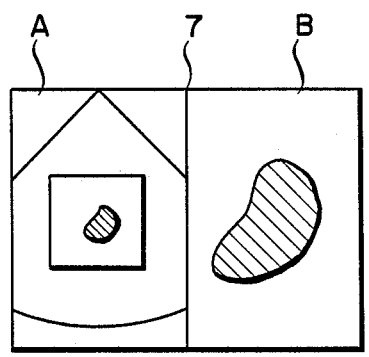
FIG. 3 is a schematic view of the display screen of the apparatus, displaying a tomogram and an enlarged part of the tomogram.

The echo signals are supplied from transmission/reception section 2 to pre-processing circuit 4 and are thus converted to digital signals or image data. The image data is input to write interpolation circuit 5. Circuit 5 interpolats the portions of the ROI image existing among the steering lines, from the image data supplied from circuit 4 and also the image data obtained by the previous transmission/reception cycle. The image data of the ROI image is stored in frame memory 6. More precisely, the items of the image data, which correspond to the n1 steering lines and are interpolated, are stored at the addresses designated by the vector data supplied from vector generator 10. The image data is read from memory 6 and supplied to display 7. As shown in FIG. 3, display 7 displays image A of the ROI defined by rate cycle T1 and angle $\theta 1$, on the left half of its screen.

To enlarge and display a part of the image of the ROI, the user first sets the apparatus to an image-enlarging mode. The user operates input unit 12, thereby inputting rate pulse frequency f2 and beam steering angle $\theta 2$ (e.g., 45°), and steering lines n2 (e.g., 128 lines), so that transducer 1 can steer a desired part of the ROI. In response to the signals showing frequency f2, angle $\theta 2$ and steering lines n2, system controller 8 supplies a control signal to transmission/reception controller 9. In response to this signal, controller 9 controls transmission/reception section 2 such that transducer 1 steers the desired part of the ROI, along n2 steering lines, the desired part being defined by rate cycle T2 shorter than cycle T1 (e.g., 148 $\mu$s when the maximum depth of view field is 10 cm) and steering angle $\theta 2$ smaller than angle $\theta 1$. In this case, 52.8 frames of image can be obtained every second. That is, in response to the control signal, controller 9 supplies section 2 with delay time data representing the various times by which the beam steering must be delayed for the respective n2 steering lines.

In accordance with the delay time data, section 2 supplies drive pulses to transducer elements of transducer 1, whereby transducer 1 emits ultrasonic beams, thus steering the ROI along the steering lines. The beams are reflected from the ROI. The transducer 1 catches the echoes from the ROI and converts them into echo signals. The delay circuit provided in section 2 delays the echo signals by the delay times represented by the delay time data supplied from transmission/reception controller 9. The echo signals are then added within transmission/reception section 2. The echo signals are supplied from transmission/reception section 2 to pre-processing circuit 4, and are thus converted to digital signals or image data. The image data is input to write interpolation circuit 5. Circuit 5 interpolates the portions of the part of the ROI image existing among the n2 steering lines, from the image data supplied from circuit 4 and also the image data obtained by the previous transmission/reception cycle. The image data showing these portions of the ROI image is stored in frame memory 6. More precisely, the items of the image data, which correspond to the n2 steering lines and are interpolated, are stored at the addresses designated by the vector data supplied from vector generator 10. The image data is read from memory 6 and supplied to display 7. As shown in FIG. 3, display 7 displays the enlarged part B of the ROI, defined by defined frequency f2 and angle $\theta 2$, on the right half of its screen.

Figure 2:
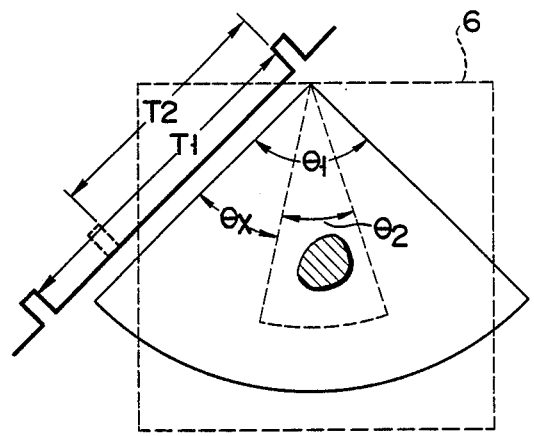
FIG. 2 is a diagram explaining how the apparatus of FIG. 1 scans the ROI of a subject.

One frame of image B is displayed for 1/52.8 second. Upon lapse of this period, transducer 1 starts steering the entire ROI as shown by solid lines in FIG. 2. The echo signals obtained by this steering are input to transmission/reception section 2. These signals are processed by pre-processing circuit 4 and write interpolation circuit 5, providing image data. The image data is stored in frame memory 6, read from memory 6 and supplied to display 7, whereby a renewed image A of the ROI is displayed on the left half of the screen.

One frame of image A is displayed for 1/17.6 second. Upon lapse of this period, transducer 1 steers the designated part of the ROI as shown by broken lines in FIG. 2. Hence, display 7 displays a renewed image B on the right half of the screen for 1/52.8 second. Upon lapse of 1/52.8 second, transducer 1 steers the entire ROI.

Since transducer 1 alternately steers the entire ROI and the designated part thereof, display 7 can display both tomogram A of the ROI and enlarged tomogram B of the part of the ROI, in real time.

Transducer 1 is removed from a previous position while tomograms A and B are being displayed, whereby the tomogram of another ROI is displayed. To display an enlarged tomogram of a desired part of this new ROI, the user operates input unit 12, thus designating the desired part of the new ROI.

The left and right ends of any desired part of a ROI, whose image is to be enlarged, are determined by two angles measured from the leftmost or rightmost steering line along which the entire ROI is steered. For example, when $\theta 1$ is 90°, and the angle $\theta x$ for determining the left end of the desired part is measured from the leftmost steering line, then the second angle for determining the right end of the desired part will be $(X+\theta 2)$ measured from the leftmost steering line.

Tomograms A and B can be displayed on two displays, respectively, instead of on the left and right halves of the screen of the same display. Furthermore, tomogram B can be continuously renewed several time after every renewal of tomogram A, instead of alternately renewing tomograms A and B. (A shorter time suffices to steer the desired part of the ROI, than to steer the entire ROI.) If this method is used, the realtime display of the enlarged image of the desired part of the ROI can be improved.

After the desired part of the tomogram of the ROI obtained by steering the entire ROI along n1 steering lines has been designated, the entire ROI can be scanned along less steering lines n1', i.e., 128 lines. The tomogram A obtained by this second steering is displayed in a reduced size. Thereafter, the designated part of the ROI can be steered along n2' steering lines (i.e., 256 lines), thus displaying the enlarged tomogram B in an enhanced resolution.

The ultrasonic imaging apparatus of the invention can simultaneously display a tomogram of the entire ROI and an enlarged tomogram of the desired part of the ROI in real time, allowing physicians or surgeons to locate any affected tissues and know the condition of such tissues. The apparatus can therefore help them to make accurate diagnoses. In addition, since the apparatus requires only one image data processing system, it is considerably simple in structure.

What is claimed is:

1. An ultrasonic imaging apparatus comprising:

ultrasonic transducer means for emitting ultrasonic beams to a subject and for generating echo signals corresponding to echoes from the subject;

ultrasonic steering signal generating means for alternately generating and supplying first and second steering signals to said ultrasonic transducer means, said first steering signal corresponding to a first rate frequency and a first steering angle which define a region of interest and allowing said transducer means to steer the region of interest of the subject, and said second steering signal corresponding to a second rate frequency and a second steering angle which define a to-be-enlarged part of the region of interest and allowing said transducer means to steer the to-be-enlarged part of the region of interest;

signal-processing means for processing the echo signals generated by said transducer means to output image signals representing the image of the region of interest and image signals representing an enlarged image of the to-be-enlarged part of the region of interest; and display means connected to said signal-processing means for receiving the image signals from said signal-processing means and having a first display section for displaying the image of the region of interest and a second display section for displaying the enlarged image of the to-be-enlarged part of the region of interest, wherein said ultrasonic steering signal generating means alternately generates said first and second steering signals so that the region of interest and the to-be-enlarged part of the region of interest are alternately scanned, and the image of the region of interest and the enlarged image of the to-be-enlarged part of the region of interest are alternately displayed on said first and second display sections.

2. The apparatus according to claim 1, wherein said ultrasonic steering signal generating means generates said first steering signal for steering the region of interest along a plurality of steering lines, and generates said second steering signal for steering the to-be-enlarged part of the region of interest along more steering lines than in steering the region of interest.

3. The apparatus according to claim 1, wherein said signal-processing means has interpolation means for interpolating image signals corresponding to the steering lines.

4. The apparatus according to claim 1, wherein said signal-processing means has a frame memory for storing one frame of image signals and supplying the one frame of image signals to said display means.

5. The apparatus according to claim 1, wherein said ultrasonic steering signal generating means generates said second steering signal having a shorter cycle than that of said first steering signal and corresponding to the second steering angle smaller than the first steering angle.

6. The apparatus according to claim 1, wherein said ultrasonic steering signal generating means generates the first steering signal for scanning a first sector scanning region including the region of interest and generates the second steering signal for scanning a second sector scanning region including the to-be-enlarged part of the region of interest.

7. The apparatus according to claim 6, wherein said ultrasonic steering signal generating means generates the second steering signal for scanning the second sector region having an edge located at a predetermined angle from an edge of the first sector region.

8. The apparatus according to claim 1, wherein said signal-processing means includes a frame memory for storing the image signal including signal components corresponding to the steering lines for scanning the to-be-enlarged part of the region of interest and means for interpolating the signal components corresponding to at least two of the steering lines.

* * * * *